United States Patent [19]
Oishi et al.

[11] Patent Number: 5,817,421
[45] Date of Patent: Oct. 6, 1998

[54] METHOD FOR FORMING AND ANTI-REFLECTION FILM OF A CATHODE-RAY TUBE, AN APPARATUS USED FOR CARRYING OUT THE METHOD AND A CATHODE-RAY TUBE HAVING THE ANTI-REFLECTION FILM

[75] Inventors: Tomoji Oishi; Sachiko Maekawa, both of Hitachi; Akira Kato, Mito; Masahiro Nishizawa, Mobara; Yoshifumi Tomita, Mobara; Kojiro Okude, Hitachi; Kenji Tochigi, Tokyo; Yutaka Misawa, Katsuta, all of Japan

[73] Assignee: Hitachi, Ltd., Tokyo, Japan

[21] Appl. No.: 446,512

[22] Filed: May 22, 1995

Related U.S. Application Data

[62] Division of Ser. No. 942,397, Sep. 9, 1992, Pat. No. 5,449,534.

[30] Foreign Application Priority Data

Sep. 20, 1991 [JP] Japan .................................. 3-241458

[51] Int. Cl.$^6$ ...................................................... B32B 9/04
[52] U.S. Cl. ........................... 428/446; 428/428; 428/448; 428/701; 428/702; 313/479; 313/480
[58] Field of Search ..................... 313/466, 479, 313/480; 428/428, 701, 702, 446, 448

[56] References Cited

U.S. PATENT DOCUMENTS

| | | | |
|---|---|---|---|
| 3,940,511 | 2/1976 | Deal | 313/479 |
| 4,965,096 | 10/1990 | Deal | 313/479 |
| 4,987,338 | 1/1991 | Itou | 313/479 |
| 5,045,751 | 9/1991 | Numata | 313/479 |
| 5,160,375 | 11/1992 | Otaki | 313/479 |
| 5,254,904 | 10/1993 | Van de Leest | 313/479 |
| 5,288,558 | 2/1994 | Nothe | 313/479 |
| 5,291,097 | 3/1994 | Kawamura | 313/479 |
| 5,446,339 | 8/1995 | Kinoshita | 313/479 |

*Primary Examiner*—Timothy M. Speer
*Attorney, Agent, or Firm*—Antonelli, Terry, Stout & Kraus, LLP

[57] ABSTRACT

An anti-reflection film is produced on the panel surface of a cathode-ray tube by:

(A) preparing a solution for forming an anti-reflection film, which contains water and a metal alkoxide having the formula, $$M(OR)_n$$

wherein M is a metal selected from the group consisting of Si, Ti, Al, Zr, Sn, In, Sb and Zn; R is an alkyl group having 1–10 carbon atoms; n is an integer of from 1 to 8; and when n is not 1, the alkyl groups represented by R may be the same or different, (B) coating the solution for forming an anti-reflection film on the outermost surface of the panel of a cathode-ray tube, and (C) applying an ultraviolet light to the solution for forming an anti-reflection film coated on said surface to cure the solution to form a transparent film with fine roughness.

This production method is carried out using an apparatus having:

(a) a coating means for coating the above solution for forming an anti-reflection film on the outermost surface of the panel of a cathode-ray tube, (b) a transferring means for transferring the solution-coated cathode-ray tube, and (c) an ultraviolet light-applying means for photocuring the solution coated on the cathode-ray tube during the transfer of the solution-coated cathode-ray tube.

In the above method, when a silicon alkoxide is used as the metal alkoxide, there can be obtained a cathode-ray tube having an anti-reflection film made of alkali-free silica on the outermost surface of the panel, said anti-reflection film giving a ratio of Si-O-Si peak intensity to Si-OH peak intensity of 4 or more when measured for infrared spectrum.

20 Claims, 6 Drawing Sheets

METHOD FOR FORMING AND ANTI-REFLECTION FILM OF A CATHODE-RAY TUBE, AN APPARATUS USED FOR CARRYING OUT THE METHOD AND A CATHODE-RAY TUBE HAVING THE ANTI-REFLECTION FILM

This application is a Divisional application of application Ser. No. 942,397, filed Sep. 9, 1992, now U.S. Pat. No. 5,449,534.

FIELD OF THE INVENTION

The present invention relates to an anti-reflection film formed on the surface of the panel of a cathode-ray tube. More particularly, it relates to a method for forming an anti-reflection film on the panel surface of a cathode-ray tube, an apparatus used for carrying out the method and a cathode-ray tube having an anti-reflection film on the panel surface.

The present invention also relates to a coating film of silica important for the antistatic film or protective film for electric appliances and a method for preparing the film at relatively low temperatures.

PRIOR ART

In recent years, cathode-ray tubes have been required to be of high performance and good visibility. In order to meet the requirement, an anti-reflection film is formed on the panel surface of a cathode-ray tube, which film contributes to the improvement of the visibility and to the protection of the panel surface (JP-A-61-118946, JP-A-62-143348 and JP-A-63-76247).

In the conventional method, an anti-reflection film is formed by applying a solution containing $Si(OR)_4$, wherein R is lower alkyl, on the panel surface of a cathode-ray tube by means of spray-coating or spin-coating and heating the solution-coated surface at a temperature of 160° C., although the temperature is so high that the cathode-ray tube is often damaged, to decompose the coated solution to form a $SiO_2$ film. This $SiO_2$ film imparts roughness on the panel surface of the cathode-ray tube and serves as an anti-reflection film.

It is also possible to form two or more films, in place of a single film, on the panel surface of a cathode-ray tube. In this case, the assembly of the films having surface roughness is sometimes called "anti-reflection film". The surface roughness of the anti-reflection film allows an incoming light to give rise to diffuse reflection and thereby makes better the visibility of the image displayed on the cathode-ray tube.

There are some cathode-ray tubes having an electrically conductive film under the anti-reflection film to improve the performance through the prevention of the electrification of the panel surface of the cathode-ray tubes. The assembly of the anti-reflection film and the electrically conductive film is sometimes called "anti-reflection antistatic film". Also, there are some color cathode-ray tubes having either an anti-reflection film containing an organic dye or an under coat layer for anti-reflection film containing an organic dye in order to make clearer the colors of their images. The anti-reflection film containing an organic dye or the assembly of the anti-reflection film and the under coat layer containing an organic dye is sometimes called "colored anti-reflection film".

As the method for forming a thin film on a substrate by applying a light to a metal alkoxide, there is known a photo CVD (JP-B-4-20982). In this method, an oxide thin film is formed based on the gas-phase decomposition reaction of a metal alkoxide by light application. Accordingly, the method is essentially different from the method of the present invention in which a light is applied to form an oxide thin film based on a liquid phase chemical synthesis reaction.

The above-mentioned conventional glare film, anti-reflection film, etc. are each formed by coating a $Si(OR)_4$ solution on the panel surface of a cathode-ray tube equipped with an electron gun etc. and baking the coated solution at a high temperature to give rise to thermal decomposition to form a $SiO_2$ film. The baking is conducted at a temperature between 160° C. and 180° C. for 30 minutes or more. Such severe conditions give an adverse effect on the inside of the cathode-ray tube and reduces the performance of the cathode-ray tube. In particular, the performance of electric gun is so badly damaged that the emission property is often deteriorated.

The severe baking conditions further give rise to cracking and peeling of the anti-reflection film due to the difference in thermal expansion coefficient between the anti-reflection film and the panel surface of the cathode-ray tube. Hence, the temperature elevation up to the baking temperature must be carefully conducted at a rate not higher than 5° C./min. By the limitation, a troublesome rate control of the temperature elevation is necessary and the total baking time is obliged to be lengthened. Moreover, a large furnace for the baking enlarges the apparatus for forming an anti-reflection film and disadvantageously raises the production cost.

For another film coated on the panel surface of a cathode-ray tube, an antistatic film, a film containing electroconductive fine particles distributed in silica is available. The method for preparing such a film includes CVD method and sputtering method. However, these methods require huge apparatuses so that they are not suited for carrying out the coating of a film on such a relatively wide surface as displays have. The formation of the film is usually carried out by the so-called sol-gel method which comprises selecting a solution of an organometallic compound or a metal complex as a starting material solution, hydrolyzing the starting material to prepare a metal cluster compound having metal-oxygen-metal linkages, forming a film with the metal cluster compound and subjecting the film to heat-treatment. Also, the thin silica film used as an insulating film for liquid crystal displays is usually prepared by sol-gel method. However, in the above-mentioned conventional method for forming a coating film for displays, organic compounds are contained as impurities in the starting materials. Therefore, it is necessary to carry out heat-treatment at elevated temperatures for removing the impurities and for making the film dense. In view of the damages given to the interior of the cathode-ray tubes or displays such as distortion and warp by heat, it is not desirable to carry out heat-treatment at elevated temperatures in the method for producing cathode-ray tubes or displays. Thus, the formation of a dense film at low temperatures would be desirable.

SUMMARY OF THE INVENTION

The present invention has been made in order to solve the above-mentioned problems of the prior art.

An object of the present invention is to provide a method for formation of anti-reflection film on the panel surface of a cathode-ray tube.

Another object of the present invention is to provide an apparatus suitably used for carrying out said method.

According to the present invention, there are provided:

a method for forming an anti-reflection film on the panel surface of a cathode-ray tube, which comprises the steps of:

(A) preparing a solution for forming an anti-reflection film, which contains water and a metal alkoxide having the formula, $$M(OR)_n$$

wherein M is a metal selected from the group consisting of Si, Ti, Al, Zr, Sn, In, Sb and Zn; R is an alkyl group having 1–10 carbon atoms; n is an integer of from 1 to 8; and when n is not 1, the alkyl groups represented by R may be the same or different, (B) coating the solution for forming an anti-reflection film on the outermost surface of the panel of a cathode-ray tube, and (C) applying an ultraviolet light to the solution for forming an anti-reflection film coated on said surface to cure the solution to form a transparent film with fine roughness;

an apparatus for forming an anti-reflection film on the panel surface of a cathode-ray tube, which comprises:

(a) a coating means for coating on the outermost surface of the panel of a cathode-ray tube a solution containing water and a metal alkoxide having the formula, $$M(OR)_n$$

wherein M is a metal selected from the group consisting of Si, Ti, Al, Zr, Sn, In, Sb and Zn; R is an alkyl group having 1–10 carbon atoms; n is an integer of from 1 to 8; and when n is not 1; the alkyl groups represented by R may be the same or different, (b) a transferring means for transferring the solution-coated cathode-ray, tube, and (c) an ultraviolet light-applying means for photocuring the solution coated on the cathode-ray tube during the transfer of the solution-coated cathode-ray tube;

a cathode-ray tube having an anti-reflection film made of alkali-free silica on the outermost surface of the panel, said anti-reflection film giving a ratio of Si-O-Si peak intensity to Si-OH peak intensity of 4 or more when measured for infrared spectrum;

a display which comprises a film mainly composed of silica which film absorbs a light having a wavelength of 250 nm more intensely than a light having a wavelength of 190 nm;

a display which comprises a film mainly composed of silica which film does not substantially fluorescent when irradiated by argon gas laser at an output power of 100 mW;

a display which comprises a film mainly composed of silica, the percentage of the number of bending Si-O-Si linkages in the film, which linkages give an absorption peak corresponding to its asymmetric stretching vibration when analyzed by Raman spectroscopic analysis, relative to the total number of straight and bending Si-O-Si linkages in the film determined by Raman spectroscopic analysis being not more than 30%, and an absorption peak corresponding to the symmetric stretching vibration of Si-O-Si linkages appearing at a region of which frequency is not lower than 812 cm$^{-1}$;

a cathode-ray tube having an antistatic function and anti-reflection function which comprises:

at least one electroconductive film formed on the panel surface of a cathode-ray tube, selected from the group consisting of:

(i) a film mainly composed of silica which film absorbs a light having a wavelength of 250 nm more intensely than a light having a wavelength of 190 nm and further comprises at least one metal oxide selected from the group consisting of indium oxide, tin oxide and antimony oxide, (ii) a film mainly composed of silica which film does not substantially fluorescent when irradiated by argon gas laser at an output power of 100 mW and further comprises at least one metal oxide selected from the group consisting of indium oxide, tin oxide and antimony oxide, and (iii) a film mainly composed of silica which film further comprises at least one metal oxide selected from the group consisting of indium oxide, tin oxide and antimony oxide, the percentage of the number of bending Si-O-Si linkages in the film, which linkages give an absorption peak corresponding to its asymmetric stretching vibration when analyzed by Raman spectroscopic analysis, relative to the total number of straight and bending SiO-Si linkages in the film determined by Raman spectroscopic analysis being not more than 30%, and an absorption peak corresponding to the symmetric stretching vibration of Si-O-Si linkages appearing at a region of which frequency is not lower than 812 cm$^{-1}$, and at least one film formed on the electroconductive film so as to have a rough surface, selected from the group consisting of:

(i') a film mainly composed of silica which film absorbs a light having a wavelength of 250 nm more intensely than a light having a wavelength of 190 nm and is free from a metal oxide other than silica, (ii') a film mainly composed of silica which film does not substantially fluorescent when irradiated by argon gas laser at an output power of 100 mW and is free from a metal oxide other than silica, and (iii') a film mainly composed of silica which film is free from a metal oxide other than silica, the percentage of the number of bending Si-O-Si linkages in the film, which linkages give an absorption peak corresponding to its asymmetric stretching vibration when analyzed by Raman spectroscopic analysis, relative to the total number of straight and bending Si-O-Si linkages in the film determined by Raman spectroscopic analysis being not more than 30%, and an absorption peak corresponding to the symmetric stretching vibration of Si-O-Si linkages appearing at a region of which frequency is not lower than 812 cm$^{-1}$; and a liquid crystal display which comprises:

at least one insulating film formed on transparent electrodes, selected from the group consisting of:

(i") a film mainly composed of silica which film absorbs a light having a wavelength of 250 nm more intensely than a light having a wavelength of 190 nm, (ii") a film mainly composed of silica which film does not substantially fluorescent when irradiated by argon gas laser at an output power of 100 mW, and (iii") a film mainly composed of silica, the percentage of the number of bending Si-O-Si linkages in the film, which linkages give an absorption peak corresponding to its asymmetric stretching vibration when analyzed by Raman spectroscopic analysis, relative to the total number of straight and bending Si-O-Si linkages in the film determined by Raman spectroscopic analysis being not more than 30%, and an absorption peak corresponding to the symmetric stretching vibration of Si-O-Si linkages appearing at a region of which frequency is not lower than 812 cm$^{-1}$, and a cell comprising liquid crystal molecules sandwiched between substrates with oriented films, formed on the insulating film.

BRIEF DESCRIPTION OF THE DRAWINGS

In FIGS. 1 and 2, 1 is a cathode-ray tube; 2 is an anti-reflection film; 3 is a spray gun; 4 is a conveyor; 5 is a supporting table; 6 is a hood; 7 is an ultraviolet lamp; and 8 is a solution for forming a film.

In FIG. 3, 9 indicates the spectrum for the film prepared according to the conventional method and 10 indicates the spectrum for the film prepared according to the method of the present invention.

In FIG. 5, 11 indicates the peak assigned to the cyclic Si-O-Si linkage, 12 indicates the peak assigned to the symmetric stretching vibration of Si-O-Si linkage, 13 indicates the peak assigned to Si-OH linkage, and 14 indicates the peak assigned to the asymmetric stretching vibration of Si-O-Si linkage.

DETAILED DESCRIPTION OF THE INVENTION

Figure 1:
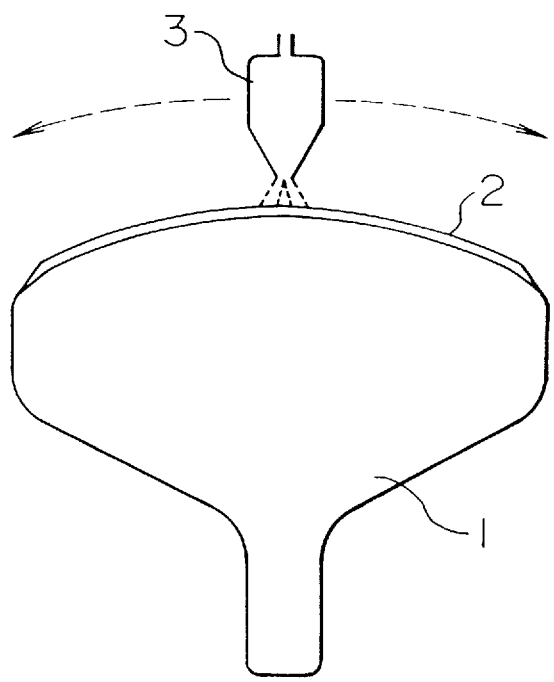
FIG. 1 is a schematic drawing showing a method for forming an anti-reflection film on the panel surface of a cathode-ray tube.

In the so-called sol-gel method, a metallic ion or a metal alkoxide is hydrolyzed to produce a hydrous oxide sol; the hydrous oxide sol is dehydrated to produce a gel; the gel is heated to produce an inorganic oxide as a desired structure or as a film on a substrate. Such the sol-gel method has been used in forming an anti-reflection film on the panel surface of cathode-ray tubes.

However, in the sol-gel method, the use of a metallic ion as a starting material disadvantageously leaves alkali metal (s) (e.g. sodium and potassium) in the anti-reflection film as a contaminant. Further, the heating of cathode-ray tube at a high temperature gives an adverse effect on the inside of cathode-ray tube. In particular, it often damages the electric gun in cathode-ray tubes, thereby the emission property of the tubes is deteriorated.

In the method of the present invention, a specific metal alkoxide is used as a starting material and an ultraviolet light is used for curing in place of heat energy, whereby an anti-reflection film is formed on the panel surface of cathode-ray tube. This approach can solve the above-mentioned problems and further enables the reduction of the processing time.

The solution for forming an anti-reflection film used in the present method contains water and a metal alkoxide having the formula,

wherein M is a metal selected from the group consisting of Si, Ti, Al, Zr, Sn, In, Sb and Zn; R is an alkyl group having 1–10 carbon atoms; n is an integer of from 1 to 8; and when n is not 1, the alkyl groups represented by R may be the same or different. The metal alkoxide is hydrolyzed by the catalytic action of an acid or an alkali, whereby some of the alkoxy groups are replaced by hydroxyl groups to form a compound represented by $(RO)_{n1}MOH$. This intermediate compound formed by partial hydrolysis reacts with other metal alkoxide molecules and grows into a condensation product represented by the following formula [1],

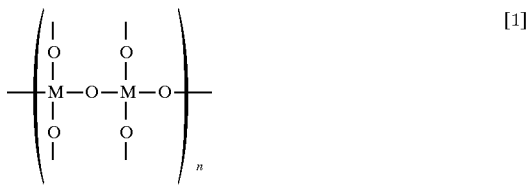

wherein M is a metal and n is an integer.

The metal M is preferably silicon. The alkyl group R is preferably an alkyl group having 1–5 carbon atoms, more preferably methyl or ethyl. The solution for forming an anti-reflection film may contain, besides water and the metal alkoxide, a diluent (e.g. alcohol) and an organic dye. Incidentally, preliminary application of an ultraviolet light to the solution for forming an anti-reflection film prior to the coating of the solution on the outermost surface of the panel of a cathode-ray tube is preferable, because it accelerates the curing of the coated solution.

The solution for forming an anti-reflection film is coated on the outermost surface of the panel of a cathode-ray tube. The means for the coating is not critical; however, the coating is preferably carried out by spraying.

The solution for forming an anti-reflection film coated on the outermost surface of the panel of a cathode-ray tube is irradiated with an ultraviolet light to cure the coated solution to form a transparent film having fine roughness. The wavelength of the ultraviolet light applied is usually 400 nm or less, preferably 350 nm or less. The intensity of the ultraviolet light is usually 5–50 mW/cm$^2$, preferably 10–30 mW/cm$^2$, more preferably 10–20 mW/cm$^2$. The time of irradiation is usually 5 minutes or more, preferably 10 minutes or more, more preferably 10–100 minutes.

It is possible to form an antistatic film between the panel surface of a cathode-ray tube and the anti-reflection film. For making the antistatic film, there is usually used a uniform dispersion of (1) ultrafine particles of tin oxide and antimony oxide, (2) ultrafine particles of indium oxide and tin oxide or (3) a mixture of zinc oxide and aluminum, in a matrix such as silica or the like. It is also possible to form an under coat layer containing an organic dye between the panel surface of a cathode-ray tube and the anti-reflection film. It is also possible to form an under coat layer containing an organic dye and an antistatic film between the panel surface of a cathode-ray tube and the anti-reflection film. In this case, there are formed, on the panel surface of a cathode-ray tube, an under coat layer, an antistatic film and an anti-reflection film in this order. Thus, the person skilled in the art may optionally form film(s) and layer(s) having respective functions between the panel surface of cathode-ray tube and the anti-reflection film.

In the present method, heating may be applied simultaneously with the application of an ultraviolet light, in such a temperature range as to give no adverse thermal effect on the inside of cathode-ray tube. The heating temperature is, with increasing preference, 180° C. or less, 160° C. or less, 120° C. or less, 100° C. or less, and 80° C. or less.

The present method can be suitably carried out by using an apparatus for forming an anti-reflection film on the panel surface of a cathode-ray tube, which comprises:

(a) a coating means for coating on the outermost surface of the panel of a cathode-ray tube a solution containing water and a metal alkoxide having the formula, $$M(OR)_n$$

wherein M is a metal selected from the group consisting of Si, Ti, Al, Zr, Sn, In, Sb and Zn; R is an alkyl group having 1–10 carbon atoms; n is an integer of from 1 to 8; and when n is not 1, the alkyl groups represented by R may be the same or different, (b) a transferring means for transferring the solution-coated cathode-ray tube, and (c) an ultraviolet light-applying means for photocuring the solution coated on the cathode-ray tube during the transfer of the solution-coated cathode-ray tube. The apparatus may further comprises:

(d) a heating means for heating the solution coated on the cathode-ray tube, during the application of an ultraviolet light to said solution.

When a silicon alkoxide is used as the metal alkoxide, the cathode-ray tube produced by the above-mentioned method has an anti-reflection film made of alkali-free silica on the outermost surface of the panel, the anti-reflection film giving a ratio of Si-O-Si peak intensity to Si-OH peak intensity of 4 or more when measured for infrared spectrum.

The sol-gel method synthesizes an inorganic polymer, i.e. an oxide, based on the above-mentioned hydrolysis reaction and condensation reaction. In the present invention, the sol-gel reaction can be accomplished by applying an ultraviolet light to feed an energy necessary for the metal-alkoxide group linkage and give rise to the scission of the metal-alkoxide group linkage.

In the present invention, it is also possible to apply a light having a wavelength capable of generating ozone to a thin film formed on the panel surface of a cathode-ray tube to form an oxide thin film of uniform composition at a low temperature. This requires no high-temperature application as employed in film formation by baking, enabling production of a high-performance cathode-ray tube.

Similar films other than the anti-reflection film, for example, antistatic film and protective film, can also be formed by the above method. By the irradiation of light on such a film at the time of heat-treatment, the UV absorption band of the film in the vicinity of 200 nm and the fluorescence of the film caused by the irradiation of argon gas laser are disappeared. The molecular structure of the film can be detected by solid $^{29}$Si-NMR method and Raman spectroscopic analysis. By the solid $^{29}$Si-NMR method, the intensities of $Q_0$ (Si(OH)$_4$), $Q_1$ (Si(OH)$_3$(OSi)), $Q_2$ (Si(OH)$_2$(OSi)$_2$), $Q_3$ (Si(OH)(OSi)$_3$) and $Q_4$ (Si(OSi)$_4$) are measured. The number of Si-O-Si linkages in the film is given by $Q_4 \times 2 + Q_3 \times 1.5 + Q_2 + Q_1 \times 0.5$, and the number of Si-OH linkages in the film is given by $Q_3 + Q_2 \times 2 + Q_1 \times 3 + Q_0 \times 4$. The bending characteristic and strength of the Si-O-Si linkage are informed by Raman spectroscopic analysis. Specifically, when the symmetric and asymmetric stretching vibrations are observed, many of the Si-O-Si linkages in the film are bending. To the contrary, when only the symmetric stretching vibration is observed and no asymmetric stretching vibration is observed, all the Si-O-Si linkages in the film are straight. Since the bending Si-O-Si linkage is much strained, the film containing many bending Si-O-Si linkages is weak. In contrast, since the straight Si-O-Si linkage is stable, the film containing many straight Si-O-Si linkages can be said to be superior in mechanical strength. The higher the frequency at which the peak of Raman shift is observed, the stronger the Si-O-Si linkage. Therefore, the molecular structure, its change and its strength are quantitatively expressed by the peak intensities and Raman shift given by Raman spectroscopic analysis. The characteristics of the film can be evaluated by an etching test with hydrofluoric acid.

The film prepared according to the method of the present invention absorbs a light having a wavelength of 250 nm more intensely than a light having a wavelength of 190 nm. It does not substantially fluorescent when irradiated by argon gas laser at an output power of 100 mW. In contrast, the film prepared solely by heat-treatment without light irradiation absorbs UV lights having a wavelength shorter than around 300 nm. The shorter the wavelength, the more intense the absorption. Also, the film prepared solely by heat-treatment fluorescents over several hours when irradiated by laser.

An anti-reflection film is formed on the panel surface of a cathode-ray tube using the film prepared according to the method of the present invention and the anti-reflection film is analyzed by Raman spectroscopic analysis. As a result, the peak corresponding to the symmetric stretching vibration of Si-O-Si linkage appears in the region of which frequency is not lower than 812 cm$^{-1}$. Based on the data and the assumptions that (1) all the Si-O-Si linkages in the film prepared by drying at room temperature are bending, (ii) all the Si-O-Si linkages in the film prepared by drying at 200° C. are straight and (iii) in the conditions between (i) and (ii), the ratio of the numbers of bending Si-O-Si linkages and straight Si-O-Si linkages is proportional to the ratio of the peak intensities at the wave number assigned to asymmetric stretching vibration and that assigned to symmetric stretching vibration, the amounts of each type of the Si-O-Si linkages are calculated. As a result, the percentage of the number of bending Si-O-Si linkages in the film relative to the total number of straight and bending Si-O-Si linkages in the film is found to be not more than 30%. The thus prepared film shows high lasting quality when subjected to an etching test with hydrofluoric acid.

The present invention is hereinafter described by way of Examples.

EXAMPLE 1

Description is made on the formation of an anti-reflection film.

To 20 ml of an ethanol solution (solution A) containing 0.5 mole/l of silicon tetraethoxide [Si(OC$_2$H$_5$)$_4$] was added a mixed solution (solution B) consisting of 20 ml of an ethanol solution containing 0.5 mole/l of water and 1 ml of an ethanol solution containing 0.1 mole/l of hydrochloric acid at a rate of 0.2 ml/min to prepare a uniform solution. To the uniform solution was applied a light having a wavelength of 210 nm which corresponded to the absorption wavelength of silicon tetraethoxide for 30 minutes.

The resulting solution was sprayed onto the panel surface of a cathode-ray tube 1 using a spray gun 3 as shown in FIG. 1 to form a coating film 2. Then, a light having a wavelength of 184 nm necessary for ozone oxidation was applied to the coating film 2 for 100 minutes to form an anti-reflection film.

The analysis of the molecular structure of the anti-reflection film by Fourier transform infrared spectroscopy showed that the ratio of Si-O-Si peak intensity to Si-OH peak intensity was 4.70. The ratio is larger than that (3.90) of a conventional anti-reflection film which is obtained by baking at 160° C. The fact leads to the conclusion that the anti-reflection film according to the present invention obtained by ultraviolet light application contains a —Si-O-Si— network structure in a larger amount than does the conventional anti-reflection film obtained by baking. In other words, the method of the present invention gives a denser anti-reflection film than the conventional method. An anti-reflection film having a higher ratio gives a film of high quality, a ratio of 4 or more being desirable for this purpose.

EXAMPLE 2

Description is made on the formation of an anti-reflection antistatic film.

To 20 ml of the solution A were added 20 ml of an ethanol solution containing 0.5 mole/l of water and 2 ml of an ethanol solution containing 0.5 mole/l of tin ethoxide [$Sn(OC_2H_5)_4$], or was added a suspension of ultrafine particles of tin oxide doped with antimony in ethanol. To the resulting solution was added the solution B at a rate of 0.2 ml/min to prepare a uniform solution. To the solution was applied a light of 210 nm for 30 minutes. The resulting solution was spin-coated (or sprayed using a spray gun) on a cathode-ray tube to form a coating film. To the coating film was applied a light having a wavelength of 184 nm necessary for ozone oxidation for 100 minutes to form an anti-reflection anti-static film. On this film was formed an anti-reflection film in the same manner as in Example 1.

EXAMPLE 3

Description is made on the formation of a colored anti-reflection film.

The solution B was added to 20 ml of the solution A at a rate of 0.2 ml/min. To the resulting solution was added an ethanol solution containing a light-fast organic dye of quinacridone type having an absorption wavelength at about 570 nm in an amount of about 5% based on the silicon tetraethoxide in the solution A. To the thus obtained solution was applied a light of 210 nm for 30 minutes. The resulting solution was coated on the panel surface of a cathode-ray tube using a spinner to form a coating film. To the coating film was applied a light having a wavelength of 184 nm necessary for ozone oxidation for 100 minutes to form a colored anti-reflection film.

Thereon were formed an anti-reflection antistatic film and further thereon an anti-reflection film in the same manners as in Examples 1 and 2.

The conditions for formation of the above colored anti-reflection film were as follows. That is, the solution to be applied was dropped on the panel surface of a cathode-ray tube; the surface was rotated at 5–30 rpm to form a uniform film; then, the surface was rotated at 150 rpm for 30 seconds; thereafter, the light was applied.

EXAMPLE 4

Figure 2:
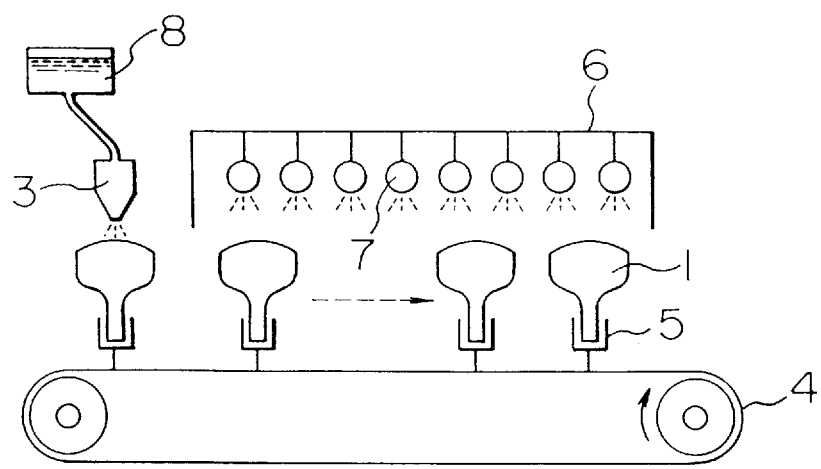
FIG. 2 is a schematic drawing showing an apparatus of the present invention used for forming an anti-reflection film on the panel surface of a cathode-ray tube.

FIG. 2 shows a schematic drawing of an apparatus for forming an anti-reflection film on the panel surface of a high-performance cathode-ray tube.

A cathode-ray tube 1 on which a coating film is to be formed is fixed to a supporting table 5 provided on a conveyor 4 which moves in a hood 6. On the panel surface of the cathode-ray tube 1 is spray-coated, using a spray gun 3, a solution for forming a film fed from a storage tank 8 for the solution. The film-formed cathode-ray tube is transferred on the conveyor 4 into the hood 6 provided with an ultraviolet lamp 7 for generation of ozone and a light having a wavelength corresponding to the absorption wavelength of metal alkoxide solution. There, the tube is irradiated with a light necessary for the curing of the film. The storage tank 8 for film-forming solution can store the solutions for forming an anti-reflection film, anti-reflection antistatic film, colored anti-reflection film, etc. These solutions can be fed from the tank to the spray gun 3.

The method of the present invention is economically advantageous because no heating is required, and the apparatus used for the present method can be made into a small size because no heating furnace is required. The curing of the film can be accelerated by conducting heating at 100° C. or below in addition to ultraviolet light application. The heating may easily be effected by feeding hot air into the hood 6.

EXAMPLE 5

An anti-reflection film was formed in the same manner as in Example 1 by heating the panel surface of a cathode-ray tube at 100° C. during the ultraviolet light application. Another anti-reflection film was formed in the same manner as in Example 1 by heating the panel surface of a cathode-ray tube at 100° C. for 30 minutes without the ultraviolet light application. The two films were compared by subjecting them to abrasion resistance test and boiling water resistance test. The abrasion resistance test is a test for examining the hardness and adhesion strength of a film by rubbing the film with a rubber eraser under a load of 1 kg and measuring the number of going to and fro of the eraser required for causing film peeling. The boiling water resistance test is a test for examining the denseness of a film by dipping the film in boiling water and measuring the time required for causing film peeling. As a result, the film obtained by light application was peeled off at 200 times (abrasion resistance test) and in 75 minutes (boiling water resistance test). In contrast, the film obtained without light application was peeled off at 50 times (abrasion resistance test) and in 15 minutes (boiling water resistance test).

EXAMPLE 6

To 20 ml of an ethanol solution containing 0.5 mole/l of silicon tetraethoxide [$Si(OC_2H_5)_4$] was added, at a rate of 0.2 ml/min, a mixed solution consisting of 20 ml of an ethanol solution containing 0.5 mole/l of water and 2 ml of an ethanol solution containing 0.1 mole/l of nitric acid. This mixed solution was spray-coated on the panel surface of a cathode-ray tube. To the coated surface was applied a light of 210 nm for 10 minutes and subsequently a light of 184 nm for 10 minutes. During the light application, the surface was kept at 100° C. by heating. The thus obtained film had good properties as an anti-reflection film.

The present method permits the formation of an anti-reflection film on the panel surface of a cathode-ray tube without heating the surface. Therefore, the cathode-ray tube is not thermally damaged in the interior. As a result, a cathode-ray tube having higher performance than conventional cathode-ray tubes can be produced at a high yield. Moreover, the present method for anti-reflection film formation is economical because it requires no heat treatment step, and can use a small apparatus in effecting the method.

EXAMPLE 7

Tetraethoxysilane, water, ethanol and nitric acid were mixed in a molar ratio of 1:12:45:0.25 to obtain a solution of starting materials. Metal cluster compounds containing Si-O-Si linkages were formed in the solution by the reaction between tetraethoxysilane, a metal alkoxide, and water. The solution was spin-coated on a substrate to form a film. The analysis of the film, which has not yet subjected to heat-treatment and irradiation of light, by solid $^{29}$Si-NMR revealed that the ratio between $Q_2$, $Q_3$ and $Q_4$ was about 1:16:33. Calculation based on the data showed that the total number of Si-O-Si linkages per silicon atom and the number of Si-OH linkages per silicon atom were about 1.8 and about 0.4, respectively.

Figure 3:
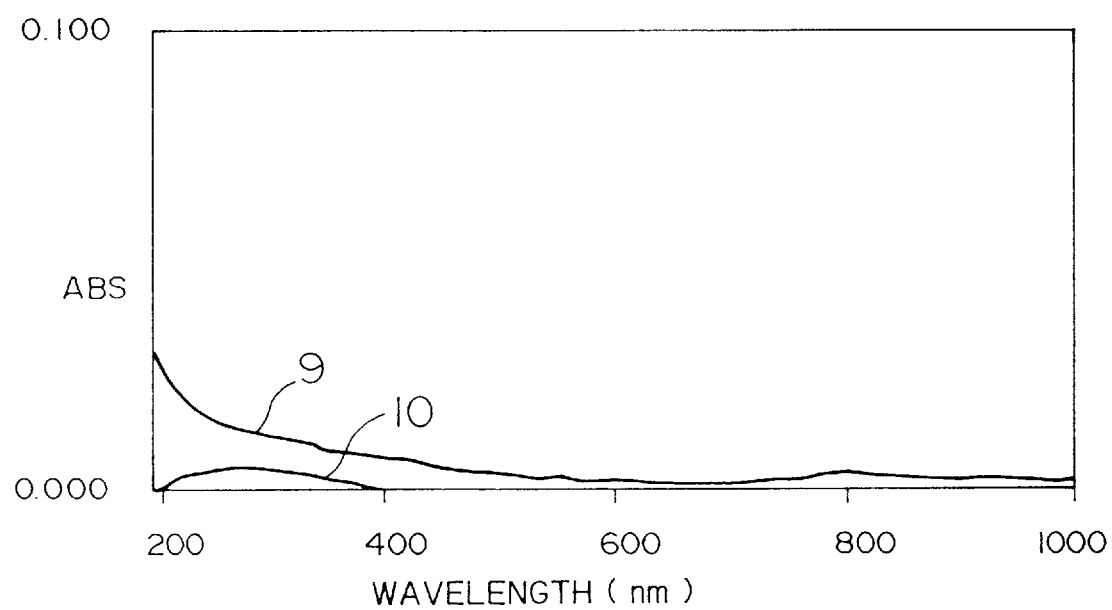
FIG. 3 shows the ultraviolet absorption spectra of a film prepared according to the conventional method by solely heating at 100° C. and a film prepared according to the method of the present invention by irradiating light while heating at 100° C.

Thereafter, the thin film was heat-treated while irradiated with lights of 254 nm and 184 nm for 10 minutes. FIG. 3 shows the ultraviolet light absorption spectrum of the thus prepared film. It is seen that the ultraviolet light absorption of the thus prepared film is less intense than that of the film prepared according to the conventional method. It is also seen that the absorption at a wavelength of 190 nm is less intense than that at a wavelength of 250 nm.

Figure 4:
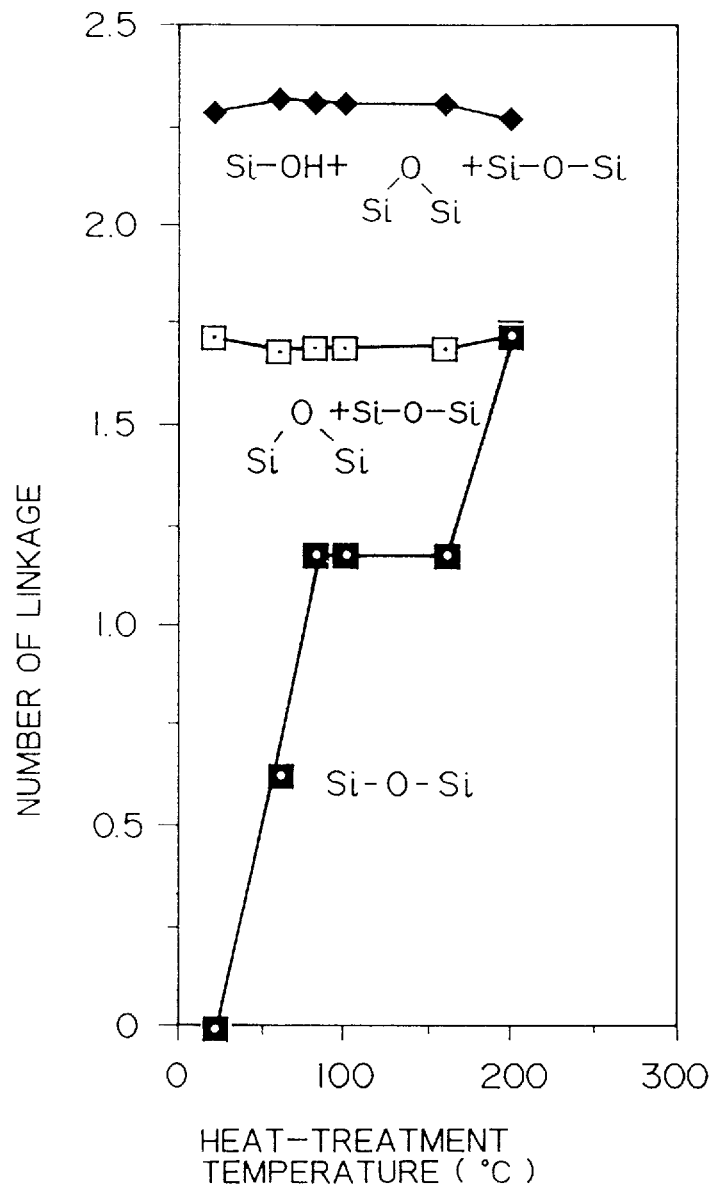
FIG. 4 shows the relationship between the heating temperatures and the numbers of bending Si-O-Si linkages per silicon atom, the numbers of bending and straight Si-O-Si linkages per silicon atom and the numbers of Si-OH and bending and straight Si-O-Si linkages per silicon atom.
Figure 5:
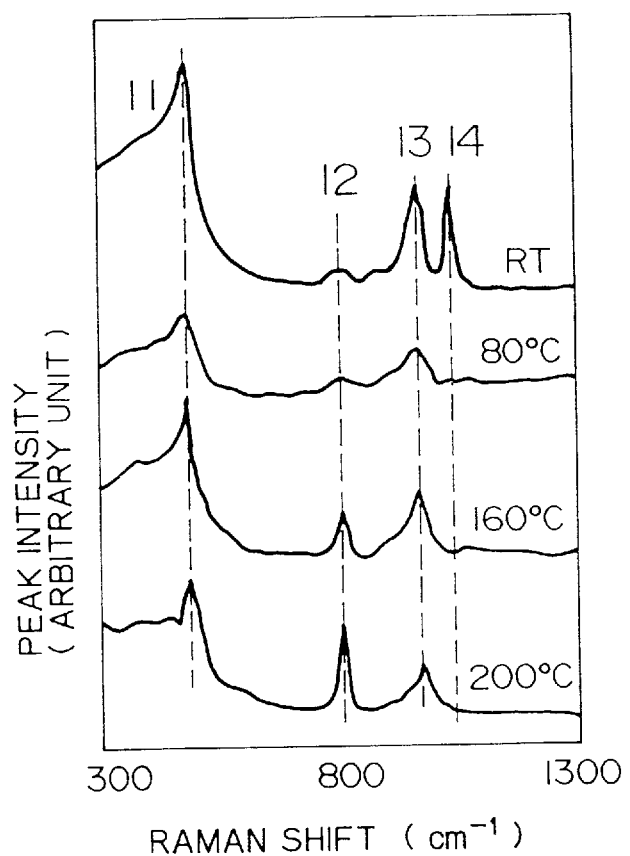
FIG. 5 shows a family of curves of Raman shift vs. peak intensity at four different heating temperatures.
Figure 6:
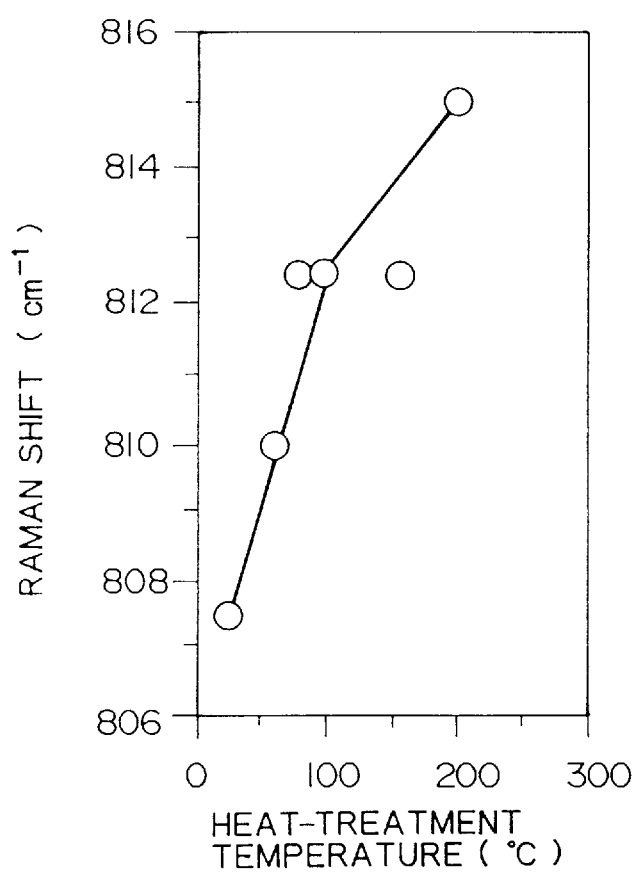
FIG. 6 shows the relationship between the heating temperature and the Raman shift of the symmetric stretching vibration of Si-O-Si linkage. It demonstrates the dependency of the Raman shift on the heating temperature.

FIG. 4 shows the relationship between the heating temperatures and the numbers of bending Si-O-Si linkages per silicon atom, the numbers of bending and straight Si-O-Si linkages per silicon atom and the numbers of Si-OH and bending and straight Si-O-Si linkages per silicon atom. It is seen that, according to the method of the present invention, heat-treatment at about 80° C. is sufficient to obtain a film containing not less than 70% of straight Si-O-Si linkages, wherein the presence of the straight Si-O-Si linkages in the film increases the film strength. FIG. 4 was drawn based on the Raman spectra presented in FIG. 5 and the dependency of the Raman shift on the heat-treatment temperature presented in FIG. 6. In FIG. 5, the absorption peak in the vicinity of 810 cm$^{-1}$ is assigned to the symmetric stretching vibration of Si-O-Si linkage, that in the vicinity of 980 cm$^{-1}$ is assigned to Si-OH linkage, and that in the vicinity of 1045 cm$^{-1}$ is assigned to the asymmetric stretching vibration of Si-O-Si linkage. On drawing FIG. 4, it is assumed that (i) all the Si-O-Si linkages in the film before the heat-treatment are bending, (ii) all the Si-O-Si linkages in the film prepared by drying at 200° C. or more are straight and (iii) in the conditions between (i) and (ii), the ratio of the numbers of bending and straight Si-O-Si linkages continuously changes depending on the ratio of peak intensities at each of the corresponding wavenumbers of Raman shift, in FIG. 6 that demonstrates the dependency of the Raman shift of the symmetric stretching vibration on the heating temperature.

Figure 7:
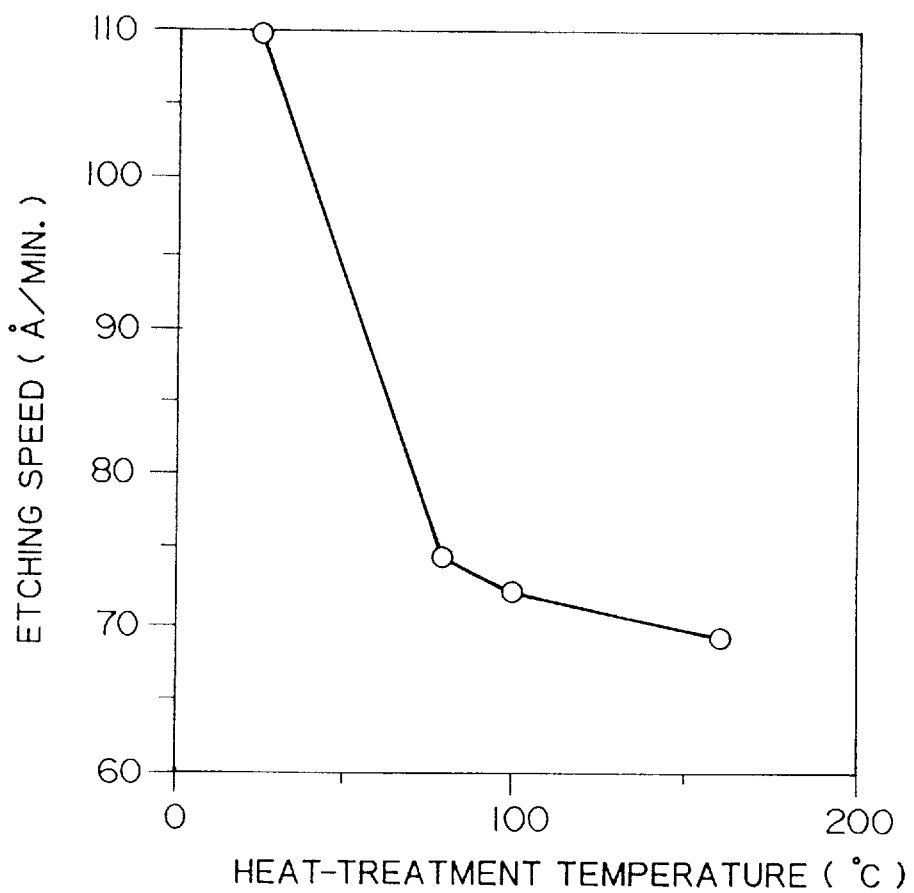
FIG. 7 shows the relationship between the heating temperature for preparing thin silica films and the etching speed by hydrofluoric acid.

Some of the films of FIG. 4 were subjected to an etching test with hydrofluoric acid. The etching was carried out at ordinary temperature using 0.098% by volume of hydrofluoric acid. The etching speed depends on the heat-treatment temperature as seen in FIG. 7. FIG. 7 demonstrates that although the etching speed is noticeably reduced at heat-treatment temperatures between ordinary temperature and 80° C., it changes little at heat-treatment temperatures not lower than 80° C. The fact closely relates to the manner that the number of straight Si-O-Si linkages in the film increases with increasing heat-treatment temperature. All the films, which had been heat-treated at various temperatures, did not fluorescent when irradiated by argon gas laser at an output power of 100 mW.

EXAMPLE 8

Tetraethoxysilane, water, ethanol and nitric acid were mixed in a molar ratio of 1:12:45:0.25 to obtain a solution. Fine particles of tin oxide having a diameter of 0.1 μm or less and fine particles of antimony oxide having a diameter of 0.1 μm or less were mixed so that the percentage of antimony relative to tin is 5% by mole, to obtain mixed particles. The mixed particles were added to the solution in an equivalent amount to tetraethoxysilane and uniformly distributed in the solution to obtain a mixture of starting materials. Metal cluster compounds containing Si-O-Si linkages were formed in the mixture by the reaction between tetraethoxysilane, a metal alkoxide, and water. The mixture was spin-coated on a substrate and heat-treated while irradiated with the light to form a film. The film contained electroconductive tin oxide and antimony oxide uniformly distributed in silica matrix. The resistance of the film was $10^9$ Ω per unit surface area.

EXAMPLE 9

Tetraethoxysilane, water, ethanol and nitric acid were mixed in a molar ratio of 1:12:45:0.25 to obtain a solution. Fine particles of indium oxide having a diameter of 0.1 μm or less and fine particles of tin oxide having diameter of 0.1 μm or less were mixed so that the a percentage of tin relative to indium is 5% by mole, to obtain mixed particles. The mixed particles were added to the solution in an equivalent amount to tetraethoxysilane and uniformly distributed in the solution to obtain a mixture of starting materials. Metal cluster compounds containing Si-O-Si linkages were formed in the mixture by the reaction between tetraethoxysilane, a metal alkoxide, and water. The mixture was spin-coated on a substrate and heat-treated while irradiated with the light to form a film. The film contained electroconductive indium oxide and tin oxide uniformly distributed in silica matrix. The resistance of the film was $10^9$ Ω per unit surface area.

EXAMPLE 10

An antistatic film was formed on the panel surface of a cathode-ray tube by spin-coating the mixture of starting materials in Example 8 and heat-treated while irradiated with the light. An anti-reflection film having a rough surface was formed on the antistatic film by spray coating the solution of starting materials in Example 7 and heat-treated while irradiated with the light. The thus prepared cathode-ray tube was free from the troubles in the inside of the tube caused by the conventional heat-treatment at elevated temperatures and showed desirable performances.

EXAMPLE 11

An antistatic film was formed on the panel surface of a cathode-ray tube by spin-coating the mixture of starting materials in Example 9 and heat-treated while irradiated with the light. An anti-reflection film having a rough surface was formed on the antistatic film by spray coating the solution of starting materials in Example 7 and heat-treated while irradiated with the light. The thus prepared cathode-ray tube was free from the damages given to the interior of the cathode-ray tube such as distortion and warp caused by the conventional heat-treatment at elevated temperatures and showed desirable performances.

EXAMPLE 12

An insulating film was formed on transparent electrodes by printing the solution of starting materials in Example 7 and heat-treated while irradiated with the light. On the insulating film was provided a cell containing liquid crystal molecules sandwiched between substrates with oriented films to prepare a liquid crystal display. The thus prepared display with an insulating film was free from the damages given to the interior of the cathode-ray tube such as distortion and warp caused by the conventional heat-treatment at elevated temperatures and showed desirable performances.

EXAMPLE 13

(1) Anti-reflection antistatic film (two-layer structure)

Providing an anti-reflection antistatic film of Example 8 on the panel surface of a cathode-ray tube and providing an anti-reflection film of Example 7 on the anti-reflection antistatic film give a cathode-ray tube exhibiting improved anti-reflection property, high strength and antistatic function.

The films were provided according to Examples 7 and 8. An antistatic film was formed on the panel surface of a cathode-ray tube by spin-coating the mixture of starting materials in Example 8 and heat-treated while irradiated with the light. An anti-reflection film was formed on the antistatic film by spray-coating the solution of starting materials in Example 7 and heat-treated while irradiated with the light. Thus, the two films were accumulated on the cathode-ray tube. The anti-reflection antistatic film containing tin oxide has a refractive index of about 2.0. The anti-reflection film containing silica has a refractive index of about 1.5. Therefore, the film surface of the thus obtained cathode-ray tube showed a lower refractive index than that of cathode-ray tubes having a one-layer film. The outermost anti-reflection film also played the role of a protective film, so that the thus obtained cathode-ray tube were of higher lasting quality than cathode-ray tubes having a one-layer film.

(2) Colored anti-reflection film (two-layer structure)

A one-layer colored anti-reflection film was formed on the panel surface of a cathode-ray tube according to Example 9. On the colored anti-reflection film was formed an anti-reflection film of silica according to Example 7 to obtain accumulated films of two-layer structure. The outermost anti-reflection film of silica protects te colored anti-reflection film, so that the thus obtained cathode-ray tube were of higher lasting quality than cathode-ray tubes having a one-layer colored anti-reflection film.

What is claimed is:

1. A cathode ray tube comprising a panel and an anti-reflection film made of alkali-free silica on the outermost surface of the panel, wherein said anti-reflection film absorbs a light having a wavelength of 250 nm more intensely than a light having a wavelength of 190 nm and wherein said film gives a ratio of Si-O-Si peak intensity to Si-OH peak intensity of 4 or more when subjected to infrared spectrum measurement.

2. A cathode-ray tube according to claim 1, wherein said anti-reflection film is transparent.

3. A cathode ray tube according to claim 1 prepared by a process comprising the steps of:

(A) preparing a solution for forming an anti-reflection film, which contains water and a metal alkoxide having the formula, $$M(OR)_n$$

wherein M is a metal selected from the group consisting of Si, Ti, Al, Zr, Sn, In, Sb and Zn; R is an alkyl group having 1–10 carbon atoms: n is an integer of from 1 to 8; and when n is not 1, the alkyl group represented by R may be the same or different, (B) coating the solution for forming an anti-reflection film on the outermost surface of the panel of a cathode-ray tube, and (C) applying an ultraviolet light to the solution for forming an anti-reflection film coated on the panel surface to cure the solution to form a transparent film with fine roughness.

4. A cathode ray tube according to claim 3, wherein all of the steps (A), (B) and (C) are conducted in an atmosphere of 100° C. or below.

5. A cathode ray tube according to claim 3, wherein the step (A) includes the step of applying an ultraviolet light to the solution for anti-reflection film.

6. A display which comprises a film made of alkali-free silica which film absorbs a light having a wavelength of 250 nm more intensely than a light having a wavelength of 190 nm.

7. A display according to claim 6, wherein said film does not substantially fluoresce when irradiated by argon gas laser at an output power of 100 mW.

8. The display of claim 7, wherein the film further comprises at least one metal oxide other than silica.

9. The display of claim 8, wherein the metal oxide other than silica is at least one metal oxide selected from the group consisting of indium oxide, tin oxide and antimony oxide.

10. A display according to claim 6 wherein the percentage of the number of being Si-O-Si linkages in the film, which linkages give an absorption peak corresponding to its asymmetric stretching vibration when analyzed by Raman spectroscopic analysis, relative to the total number of straight and bending Si-O-Si linkages in the film determined by Raman spectroscopic analysis being not more than 30%, and an absorption peak corresponding to the symmetric stretching vibration of Si-O-Si linkages appearing at a region of which frequency is not lower than 812 cm$^1$.

11. The display of claim 10, wherein the film further comprises at least one metal oxide other than silica.

12. The display of claim 11, wherein the metal oxide other than silica is at least one metal oxide selected from the group consisting of indium oxide, tin oxide and antimony oxide.

13. The display of claim 6, wherein the film further comprises at least one metal oxide other than silica.

14. The display of claim 13, wherein the metal oxide other than silica is at least one metal oxide selected from the group consisting of indium oxide, tin oxide and antimony oxide.

15. A display according to claim 6, wherein said film is transparent.

16. A display according to claim 6 prepared by a process comprising the steps of:

(A) preparing a solution for forming an anti-reflection film, which contains water and a metal alkoxide having the formula, $$M(OR)_n$$

wherein M is a metal selected from the group consisting of Si, Ti, Al, Zr, Sn, In, Sb and Zn; R is an alkyl group having 1–10 carbon atoms: n is an integer of from 1 to 8; and when n is not 1, the alkyl group represented by R may be the same or different, (B) coating the solution for forming an anti-reflection film on the outermost surface of the panel of a cathode-ray tube, and (C) applying an ultraviolet light to the solution for forming an anti-reflection film coated on the panel surface to cure the solution to form a transparent film with fine roughness.

17. A display according to claim 16, wherein all of the steps (A), (B) and (C) are conducted in an atmosphere of 100° C. or below.

18. A display according to claim 16, wherein the step (A) includes the step of applying an ultraviolet light to the solution for anti-reflection film.

19. A cathode-ray tube having an antistatic function and anti-reflection function which comprises:

at least one electroconductive film formed on the panel surface of a cathode-ray tube which film absorbs a light having a wavelength of 250 nm more intensely than a light having a wavelength of 190 nm, selected from the group consisting of:

(i) a film made of alkali-free silica and comprises at least one metal oxide selected from the group consisting of indium oxide, tin oxide and antimony oxide, (ii) a film made of alkali-free silica which film does not substantially fluoresce when irradiated by argon gas laser at an output power of 100 mW and further comprises at least one metal oxide selected from the group consisting of indium oxide, tin oxide and antimony oxide, and (iii) a film made of alkali-free silica which film further comprises at least one metal oxide selected from the group consisting of indium oxide, tin oxide and antimony oxide, the percentage of the number of bending Si-O-Si linkages in the film, which linkages give an absorption peak corresponding to its asymmetric stretching vibration when analyzed by Raman spectroscopic analysis, relative to the total number of straight and bending Si-O-Si linkages in the film determined by Raman spectroscopic analysis being not more than 30%, and an absorption peak corresponding to the symmetric stretching vibration of Si-O-Si linkages appearing at a region of which frequency is not lower than 812 $cm^{-1}$, and at least one film formed on the electroconductive film so as to have a rough surface, selected from the group consisting of:

(i') a film made of alkali-free silica which film absorbs a light having a wavelength of 250 nm more intensely than a light having a wavelength of 190 nm and is free from a metal oxide other than silica, (ii') a film made of alkali-free silica which film does not substantially fluoresce when irradiated by argon gas laser at an output power of 100 mW and is free from a metal oxide other than silica, and (iii') a film made of alkali-free silica which film is free from a metal oxide than silica, the percentage of the number of bending Si-O-Si linkages in the film, which linkages give an absorption peak corresponding to its asymmetric stretching vibration when analyzed by Raman spectroscopic analysis, relative to the total number of straight and bending Si-O-Si linkages in the film determined by Raman spectroscopic analysis being not more than 30%, and an absorption peak corresponding to the symmetric stretching vibration of Si-O-Si linkages appearing at a region of which frequency is not lower than 812 $cm^{-1}$.

20. A liquid crystal display which comprises:

at least one insulating film formed on transparent electrodes made of alkali-free silica which film absorbs a light having a wavelength of 250 nm more intensely than alight having a wavelength of 190 nm, wherein said film is selected from the group consisting of (i") a film made of alkali-free silica which film does not substantially fluoresce when irradiated by argon gas laser at an output power of 100 mW, and (ii") a film made of alkali-free silica, the percentage of the number of bending Si-O-Si linkages in the film, which linkages give an absorption peak corresponding to its asymmetric stretching vibration when analyzed by Raman spectroscopic analysis, relative to the total number of straight and bending Si-O-Si linkages in the film determined by Raman spectroscopic analysis being not more than 30%, and an absorption peak corresponding to the symmetric stretching vibration of Si-O-Si linkages appearing at a region of which frequency is not lower than 812 $cm^{-1}$, and a cell comprising liquid crystal molecules sandwiched between substrates with oriented films, formed on the insulating film.

* * * * *